Patented Dec. 18, 1928.

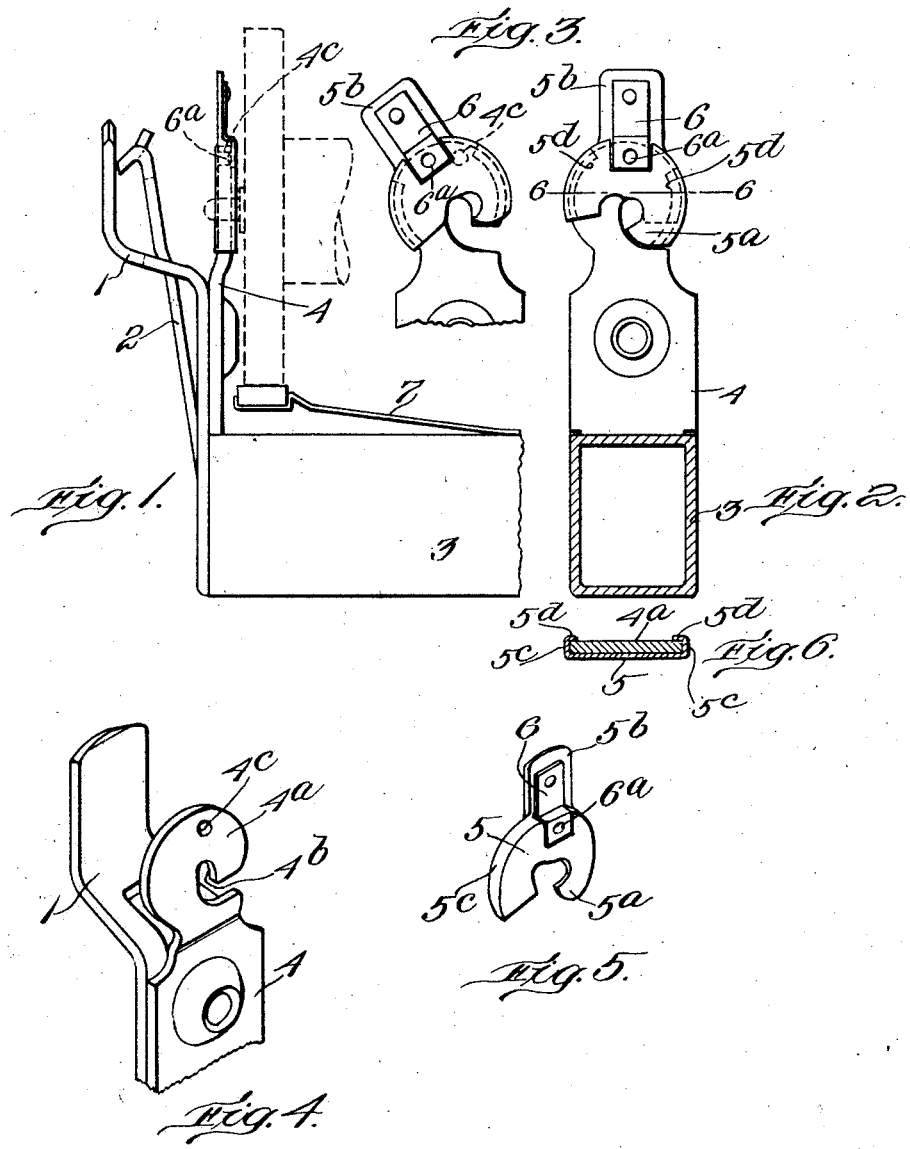

1,696,161

UNITED STATES PATENT OFFICE.

EDGAR F. HATHAWAY, OF WELLESLEY, MASSACHUSETTS, ASSIGNOR TO SHAWMUT ENGINEERING COMPANY, OF BOSTON, MASSACHUSETTS, A CORPORATION OF MASSACHUSETTS.

SPOOL-SUPPORTING MEANS FOR TUBE FRAMES.

Application filed December 5, 1923. Serial No. 678,660.

This invention relates to tube frames, and is especially concerned with the provision of means for conveniently and securely supporting the yarn-spool journal in the tube frame in such manner as to allow its ready removal while preventing accidental displacement of the journal from its bearing.

In a general way the invention comprises, essentially, a spool-supporting means characterized by a bearing bracket provided with an open or slotted bearing recess for the reception of a spool-journal, combined with a keeper specially formed to have interlocking or retaining engagement with the upper end of the bearing bracket so as to permit rotative or oscillatory movement of the keeper into and out of position to lock or retain the spool-journal against accidental displacement from its bearing seat. This and other features of the invention will be explained in the following specification and will be defined in the claims hereto annexed.

In the accompanying drawings I have illustrated a simple, cheap and convenient form of construction embodying the principles of this invention, in which:

Figure 1 is a front elevation showing one end of a tube frame equipped with my improved spool-supporting means.

Figure 2 is an inside elevation showing the spool-bearing bracket with the movable keeper or journal-retaining member in closed position.

Figure 3 is a similar view of the upper end or bearing portion of the spool-bearing bracket showing the keeper in open position to permit the insertion or removal of the spool-journal.

Figure 4 is a perspective view of the upper end of the spool-journal and suspension arm.

Figure 5 is a perspective view of the keeper or journal-restaining member removed from the bearing bracket.

Figure 6 is an edge view, partly in cross section, of the keeper showing its interlocking connection with the upper end of the bearing bracket.

In the practice of the invention, according to the form illustrated in the drawings, I employ any usual or suitable form of suspension means, in this case embracing the chain-penetrating suspension arm 1, and its cooperating hook-arm 2, by which the tube frame is releasably supended from the overhead carrier chain, and which are secured to the end of the longitudinal carrier bar 3, which, in this case, is shown to be of rectangular tubing.

The spool-bearing bracket 4, extends upwardly beyond the outwardly offset portion of the main suspension arm 1, and has its upper end 4ª formed in the arc of a circle, the interior portion being provided with a bearing recess 4ᵇ which is open or slotted to permit the lateral insertion and removal of the spool-bearing journal. The particular form of bearing recess shown in the drawings is in the form of an L shaped slot with its closed end extending vertically upward to form a downwardly opening bearing seat for the journal, the lateral branch of the L shaped slot being extended outwardly to the edge of the bracket below the level of the bearing seat portion. The position of the yarn-spool is shown in dotted lines in Figure 1, and receives the upward thrust of the spring brake arm 7, which tends to force the journal yieldingly into the bearing seat portion of the open recess. To guard against accidental displacement of the yarn-spool from the bearing seat portion of the bearing recess I provide a keeper of novel construction which consists, in this case, of a plate 5, having an offset upwardly extending tongue or handle 5ᵇ. This keeper has its edge or periphery in the form of an arc of a circle corresponding to the circular arc of the upper or bearing end portion 4ª, of the spool bracket 4, and is formed with a laterally projecting flange 5ᶜ, forming a shallow rim adapted to surround and ride upon the circular periphery of the portion 4ª, said rim portion 5ᶜ being provided at its outer edges with inwardly turned narrow flanges or lips 5ᵈ, thus forming a hollow track or channel interconnecting the keeper with the bearing end of the spool-bracket in such manner as to permit partial rotation or oscillation to and fro of the keeper thereon. The middle of the body portion of the keeper is apertured to receive the journal, the aperture being extended to form a hook portion 5ª, which, when turned in a contra-clockwise direction as shown in Figure 3, leaves the slotted recess open or unobstructed for the insertion or removal of the spool-journal. When the keeper is turned in a clockwise direction, according to the showing in Figure 2, this hook portion 5ª is brought into journal-retaining or bearing-closing position, thus obstructing the escape of the journal from its bearing seat.

Usually I prefer to employ a spring detent as an additional safety factor in retaining the keeper in bearing-closing position, and with this object in view I have secured in any suitable manner, as by riveting, a spring arm or detent 6, to the handle portion 5$^b$ of the keeper, the lower end of the spring being offset to lie flush against the face of the body portion 5 of the keeper and being provided with an indented teat 6$^a$, which springs into a punched-out recess 4$^c$, formed in the ear shaped bearing end 4$^a$ of the spool bracket.

This spring detent will yield when substantial pressure of the thumb or finger is exerted in a contra-clockwise direction against the handle 5$^b$, to release the same and automatically locks itself in place when the keeper is turned to journal-retaining position.

The connection between the pivotal keeper and the spool-bearing bracket may be made so as to have a sufficiently long bearing surface to avoid loosening of the parts by wear, while the structure is very compact and does not in any way interfere with the normal unwinding movement of the yarn-spool. It will be understood that the outside retaining flanges 5$^d$ are usually crimped or bent down over the outside edge of the bearing end portion of the bracket after the keeper has been applied thereto.

What I claim is:

1. Spool supporting means for a tube frame embracing in combination a spool bearing bracket provided with an open slot bearing recess for a spool journal, a partially rotatable keeper provided with peripheral means affording permanent interlocking exterior bearing engagement with the circular peripheral edge of the upper end of the bearing bracket whereby the keeper is retained by the bracket so as to permit rotative movement thereon and a detent mounted on the keeper and arranged to form yielding interlocking engagement with a cooperating recess of the bracket to prevent accidental displacement of the keeper, said detent being releasable by the circumferential thrust of the keeper when the operator rotates the keeper to open position.

2. In a tube frame for tuft weaving a combination with an upper bearing bracket whose upper end is of circular contour to form a peripheral bearing surface substantially exceeding a semi-circle and is provided with a laterally opening bearing slot whose inner closed portion forms a bearing to receive the upward thrust of a spool journal, a rotatable slotted keeper having peripheral bearing portions externally embracing the circular periphery of said arm at points including more than a semi-circle to rotatably attach the keeper to said arm independently of any aid from the journal and a self-locking detent acting to retain the keeper in its bearing closing position by a yielding engagement that is self-releasing when the operator rotates the keeper from its closed position.

In witness whereof, I have subscribed the above specification.

EDGAR F. HATHAWAY.